United States Patent
Chen et al.

(10) Patent No.: US 11,984,285 B2
(45) Date of Patent: May 14, 2024

(54) PPTC DEVICE HAVING LOW MELTING TEMPERATURE POLYMER BODY

(71) Applicant: Littelfuse, Inc., Chicago, IL (US)

(72) Inventors: Jianhua Chen, Sunnyvale, CA (US); Chun Kwan Tsang, Morgan Hill, CA (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 17/349,065

(22) Filed: Jun. 16, 2021

(65) Prior Publication Data

US 2021/0313135 A1 Oct. 7, 2021

Related U.S. Application Data

(62) Division of application No. 16/138,611, filed on Sep. 21, 2018, now abandoned.

(60) Provisional application No. 62/561,793, filed on Sep. 22, 2017.

(51) Int. Cl.
| | |
|---|---|
| *H01C 7/02* | (2006.01) |
| *C08K 3/14* | (2006.01) |
| *C08L 23/06* | (2006.01) |
| *C08L 23/16* | (2006.01) |
| *H01B 1/20* | (2006.01) |
| *H01H 85/06* | (2006.01) |
| *H02H 9/02* | (2006.01) |

(52) U.S. Cl.
CPC ............... *H01H 85/06* (2013.01); *C08K 3/14* (2013.01); *C08L 23/06* (2013.01); *C08L 23/16* (2013.01); *H02H 9/026* (2013.01); *C08K 2201/001* (2013.01)

(58) Field of Classification Search
CPC .... H01H 85/06; C08K 3/14; C08K 2201/001; C08L 23/06; C08L 23/16; H02H 9/026; H01C 7/02; H01C 7/027; H01B 1/02; H01B 1/20

See application file for complete search history.

(56) References Cited

U.S. PATENT DOCUMENTS

| | | | |
|---|---|---|---|
| 5,793,276 | A | 8/1998 | Tosaka et al. |
| 7,286,038 | B1 | 10/2007 | Wang et al. |
| 8,653,932 | B2 | 2/2014 | Yang |
| 2002/0094441 | A1 | 7/2002 | Korzhenko |
| 2004/0041683 | A1* | 3/2004 | Tosaka ............... H01C 7/027 338/22 R |
| 2007/0146112 | A1 | 6/2007 | Wang et al. |
| 2008/0074232 | A1 | 3/2008 | Chen et al. |

(Continued)

FOREIGN PATENT DOCUMENTS

| | | |
|---|---|---|
| CA | 2479926 A1 | 10/2003 |
| CN | 104103390 A | 10/2014 |

(Continued)

OTHER PUBLICATIONS

Machine translation of JP-2014207421. (Year: 2004).*

*Primary Examiner* — Haidung D Nguyen

(74) *Attorney, Agent, or Firm* — KDW Firm PLLC

(57) ABSTRACT

A fuse device may include a PPTC body; a first electrode, disposed on a first side of the PPTC body; and a second electrode, disposed on a second side of the PPTC body. The PPTC body may comprise a polymer matrix and a conductive filler, wherein the fuse device has a trip temperature of less than 120° C.

7 Claims, 4 Drawing Sheets

(56) References Cited

U.S. PATENT DOCUMENTS

| | | | |
|---|---|---|---|
| 2013/0094116 A1 | 4/2013 | Yang et al. | |
| 2014/0146432 A1* | 5/2014 | Wang .................... | H01C 7/027 361/93.7 |
| 2014/0305923 A1 | 10/2014 | Dorfman et al. | |
| 2014/0306605 A1 | 10/2014 | Lo et al. | |

FOREIGN PATENT DOCUMENTS

| | | | |
|---|---|---|---|
| CN | 104319042 A | | 1/2015 |
| CN | 103762012 B | | 8/2016 |
| CN | 106317544 A | | 1/2017 |
| JP | 2014207421 A | * | 10/2014 |

\* cited by examiner

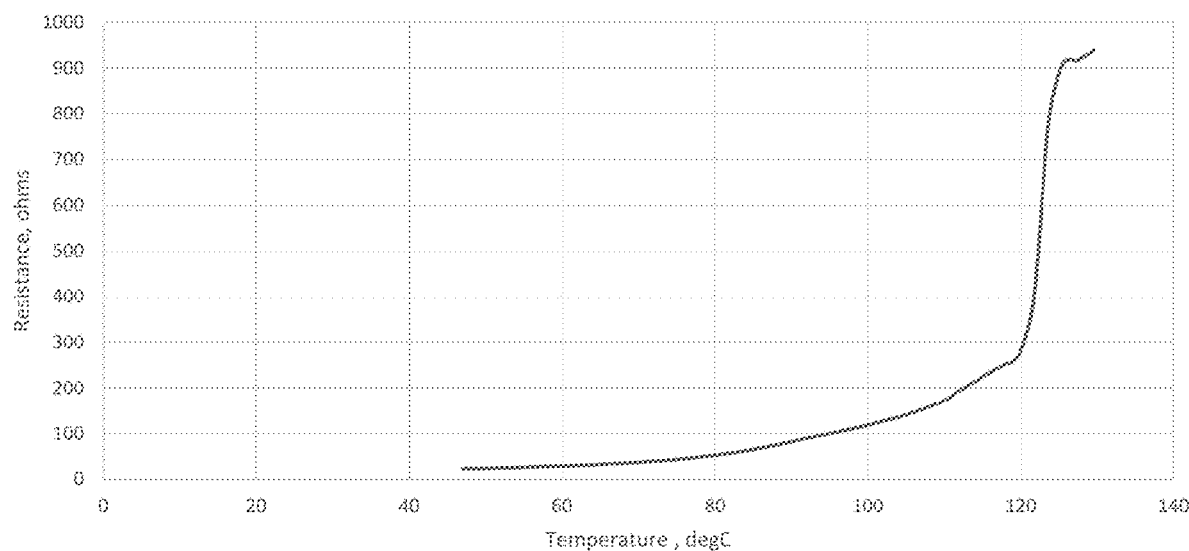
*FIG. 2*
*FIG. 3*
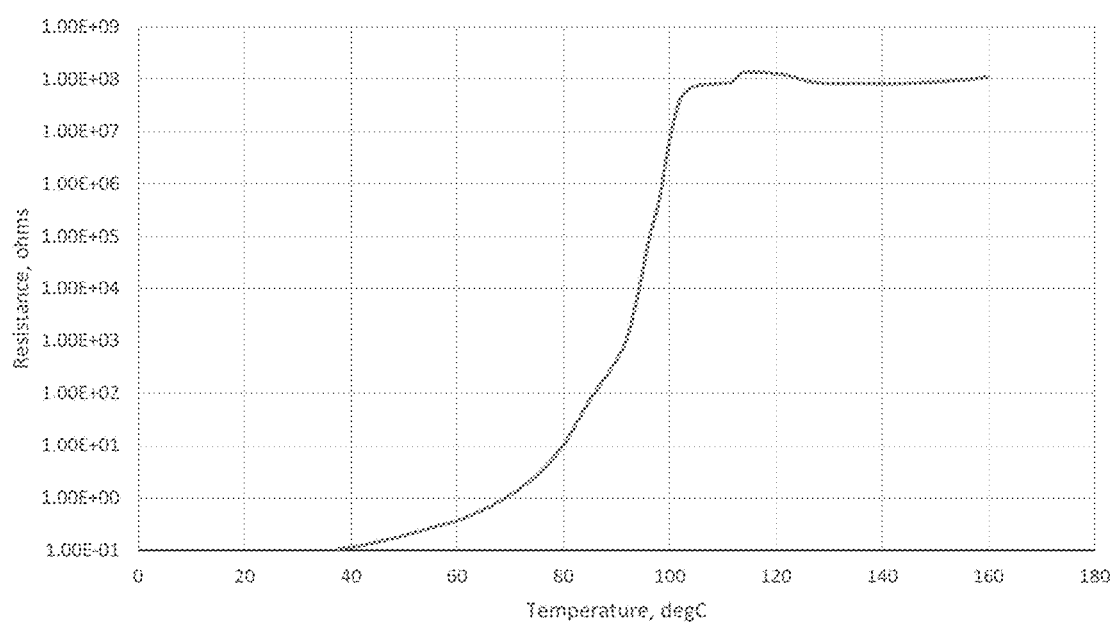

PPTC DEVICE HAVING LOW MELTING TEMPERATURE POLYMER BODY

RELATED APPLICATIONS

This application is a divisional of U.S. patent application Ser. No. 16/138,611, filed Sep. 21, 2018 entitled "PPTC Device Having Low Melting Temperature Polymer Body" and claims priority to U.S. Provisional Patent Application Ser. No. 62/561,793, filed Sep. 22, 2017, entitled, "PPTC Device Having Low Melting Temperature Polymer Body," and incorporated by reference herein in its entirety.

BACKGROUND

Embodiments relate to the field of circuit protection devices, including fuse devices.

FIELD

Embodiments relate to the field of circuit protection devices, including fuse devices.

DISCUSSION OF RELATED ART

Polymer positive temperature coefficient (PPTC) devices may be used as overcurrent or over-temperature protection device, as well as current or temperature sensors, among various applications. In overcurrent or over-temperature protection applications, the PPTC device may be considered a resettable fuse, designed to exhibit low resistance when operating under designed conditions, such as low current. The resistance of the PPTC device may be altered by direct heating due to temperature increase in the environment of the circuit protection element, or via resistive heating generated by electrical current passing through the circuit protection element. For example, a PPTC device may include a polymer material and a conductive filler that provides a mixture that transitions from a low resistance state to a high resistance state, due to changes in the polymer material, such as a melting transition or a glass transition. At such a transition temperature, sometimes called a trip temperature, where the trip temperature may often range from room temperature or above, the polymer matrix may expand and disrupt the electrically conductive network, rendering the composite much less electrically conductive. This change in resistance imparts a fuse-like character to the PPTC materials, which resistance may be reversible when the PPTC material cools back to room temperature.

The behavior of PPTC devices may be tailored to satisfy various criteria, including robust performance, as well as operation temperature. For example, known fluoropolymer-based PPTC devices may provide reliable trip temperatures in the range of 160° C. or greater. This performance may not be suitable for all applications. With respect to this and other considerations the present disclosure is provided.

BRIEF SUMMARY

In one embodiment a fuse device may include a PPTC body; a first electrode, disposed on a first side of the PPTC body; and a second electrode, disposed on a second side of the PPTC body. The PPTC body may include a polymer matrix and a conductive filler, wherein the polymer matrix comprises a polymer having a melting temperature of less than 150° C.

In another embodiment, a fuse device may include a PPTC body; a first electrode, disposed on a first side of the PPTC body; and a second electrode, disposed on a second side of the PPTC body. The PPTC body may include a polymer matrix and a conductive filler, wherein the polymer matrix comprises a low temperature PVDF material having a melting temperature in a range between 90° C. and 110° C.

In a further embodiment, a fuse device may include a PPTC body; a first electrode, disposed on a first side of the PPTC body; and a second electrode, disposed on a second side of the PPTC body. The PPTC body may include a polymer matrix and a conductive filler, wherein the polymer matrix comprises a linear low-density polyethylene material, having a melting temperature is a range of 100° C.

BRIEF DESCRIPTION OF THE DRAWINGS

FIG. 2 and FIG. 3 illustrate exemplary resistance behavior for two different PPTC formulations, according to different embodiments of the disclosure;

DESCRIPTION OF EMBODIMENTS

Figure 1A:
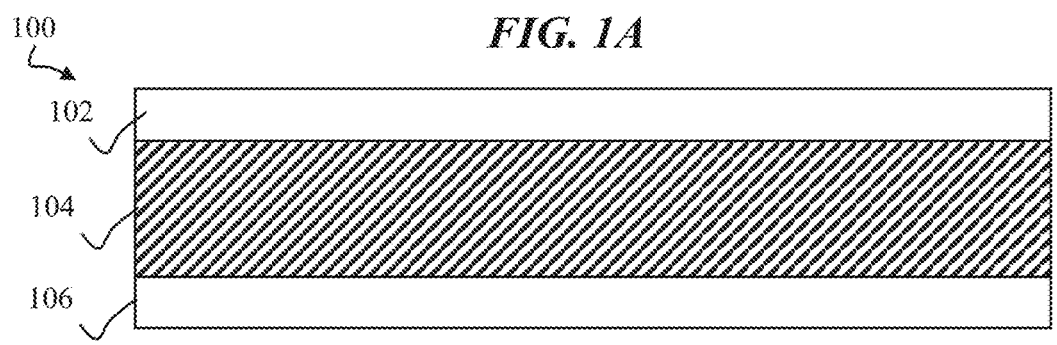
FIG. 1A and FIG. 1B illustrate a PPTC device according to embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, novel device structures and materials are provided for forming a PPTC device, where the PPTC device is configured to operate as a fuse device at relatively low temperatures. In various embodiments, a low trip-temperature PPTC is formed using a select combination of a fluoropolymer and conductive filler. According to some embodiments, a PPTC device may exhibit a trip temperature of less than 150° C.

Figure 1B:
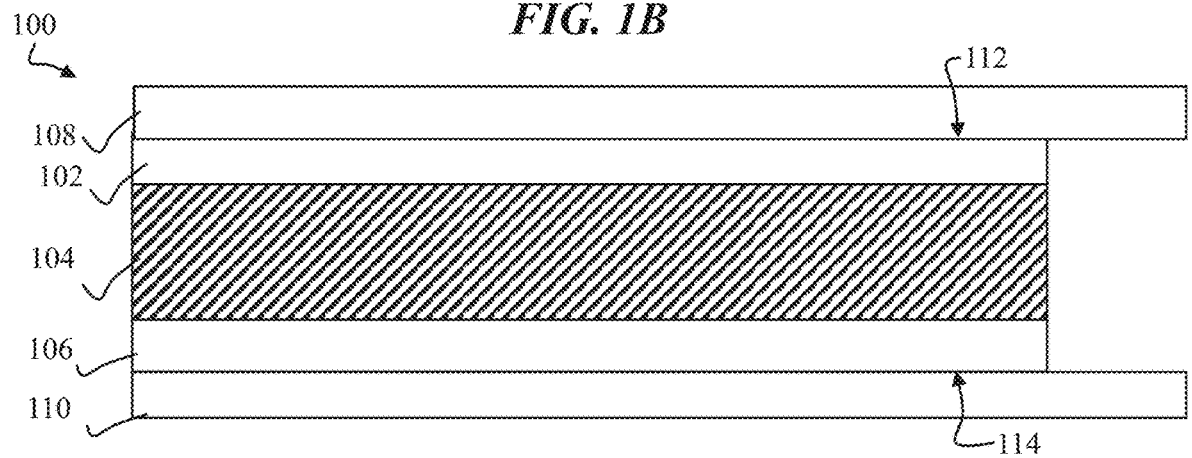

In various embodiments, a PPTC device may be constructed as shown in FIG. 1A and FIG. 1B. FIG. 1A illustrates a side cross-sectional view of a PPTC device 100, where a PPTC body 104 is disposed between a first electrode 102 and a second electrode 106, arranged on a first side and a second side, respectively. FIG. 1B illustrates a configuration of the PPTC device 100 after a first terminal 108 is joined to the first electrode 102 and a second terminal 110 is joined to the second electrode 106. According to embodiments of the disclosure, the PPTC body 104 may be formed from a relatively low melting temperature polymer as detailed below. The first electrode 102 and second electrode 106 may be formed of known metals, such as a copper foil. In some embodiments, the copper foil may be nickel plated. The first terminal 108 and second terminal 110 may also be formed of known materials, such a copper or brass. The first terminal 108 and the second terminal 110 may form a first interface 112 and second interface 114 with the first terminal 108 and second terminal 110, such as by welding. The embodiments are not limited in this context.

In some embodiments, the PPTC body may be formed using a polymer matrix such as a low melting point polyvinylidene fluoride (PVDF) polymer, an ethylene vinyl acetate (EVA) polymer, a high-density polyethylene (HDPE), a low-density polyethylene (LDPE), a linear low density polyethylene (LLDPE), or an ethylene butyl acrylate (EBA) polymer. In other embodiments, the polymer matrix may be any crystalline polyolefin polymer, olefin copolymer, or combination of the two.

In various non-limiting embodiments, the polymer matrix may comprise a PVDF material having a melting temperature below 150 C, where the volume fraction of polymer in the PPTC body 35 to 75%, wherein the conductive filler comprises a volume fraction of 25 to 65%, and wherein the volume resistivity of the conductive filler is less than 500 µΩ-cm.

In various non-limiting embodiments, the polymer matrix may comprise a polyolefin polymer, olefin copolymer, or combination of the two, where the polymer matrix has a melting temperature of 120° C. or less, where the volume fraction of polymer in the PPTC body 35 to 75%, wherein the conductive filler comprises a volume fraction of 25 to 65%, and wherein the volume resistivity of the conductive filler is less than 500 µΩ-cm.

In various non-limiting embodiments, the hold current density of the PPTC body at 25 C may range from 0.05 to 0.4 A/mm$^2$. The embodiments are not limited in this context.

According to some embodiments, the conductive filler of the PPTC body 104 may be formed from conductive particles having a particle size in the range of 0.1 µm to 50 µm. The embodiments are not limited in this context. In some non-limiting embodiments, the particles may be a conductive ceramic, metal boride, metal nitride, or metal carbide (e.g., Tungsten carbide, titanium carbide, titanium diboride, vanadium carbide, zirconium carbide).

In other non-limiting embodiments, the conductive particles may be a metal, such as nickel, tungsten or copper. In additional non-limiting embodiments, the conductive particles may be a metal alloy such as a nickel-copper alloy, copper-tin alloy, or other alloy. In still further embodiments, the conductive filler particles may be a carbon material, such as carbon black, graphite.

Turning now to FIG. 2 there is shown a graph plotting the resistance behavior as a function of temperature of a PPTC device, arranged according to embodiments of the disclosure. In this example, the PPTC body is formed using a special low melting point PVDF polymer material, where the melting temperature is in the range of 100° C., such as between 90° C. and 110° C. The PVDF polymer material used in this example contrasts with conventional PVDF that exhibits a melting temperature of approximately 175° C. The conductive filler used for the example of FIG. 2 is a tungsten carbide filler, at approximately 44% by volume fraction of the PPTC body. As shown in FIG. 2 a gradual and modest increase in resistance takes place above 60° C., while an abrupt increase in resistance takes place at 120° C. Accordingly, the PPTC material of FIG. 2 may be deemed to exhibit a trip temperature of 120° C.

Turning now to FIG. 3 there is shown a graph plotting the resistance behavior as a function of temperature of a PPTC device, arranged according to other embodiments of the disclosure. In this example, the PPTC body is formed using a special low melting temperature LLDPE material, where the melting temperature is in the range of 100° C. The LLDPE material used in this example contrasts with conventional PVDF that exhibits a melting temperature of approximately 175° C. The conductive filler used for the example of FIG. 3 is a tungsten carbide filler, at approximately 44% by volume fraction of the PPTC body. As shown in FIG. 3 a gradual and modest increase in resistance takes place above 40° C., while an abrupt increase in resistance takes place at approximately 80-100° C. Accordingly, the PPTC material of FIG. 3 may be deemed to exhibit a trip temperature of 90° C.

The hold current density (the ratio of the hold current of the low tripping temperature PTC materials layer at 25° C. to the area of PPTC through which current travels between opposing electrodes) of the above examples of FIG. 2 and FIG. 3 may be designed to exhibit a value between 0.05 to 0.4 A/mm$^2$ by appropriate choice of volume fraction of conductive filler and type of conductive filler, as discussed above.

Figure 4:
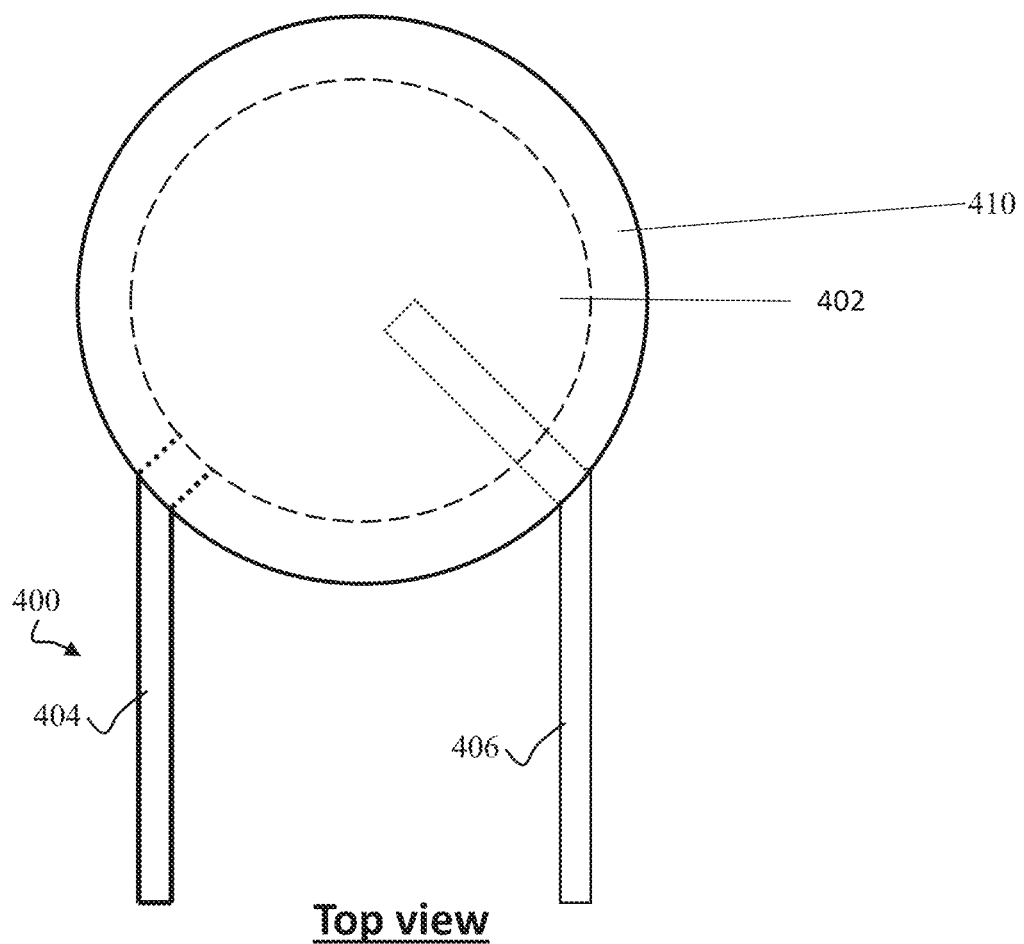
FIG. 4 shows a PPTC device according to various embodiments of the disclosure.

The configuration of a PPTC device may vary according to different embodiments of the disclosure. FIG. 4 presents a top plan view of a PPTC device 400, shown as radial lead PPTC, including bottom lead 404 and top lead 406, attached to opposite surfaces of a PPTC body 402. The PPTC body 402 may have first and second electrodes (not separately shown) attached to the top surface and bottom surface, respectively, as generally described above. The PPTC device 400 may be encapsulated by an encapsulant layer 410, such as an epoxy. The PPTC body 402 may be formulated generally as described above, for operation at a low trip temperature, such as below 150 C.

Figure 5:
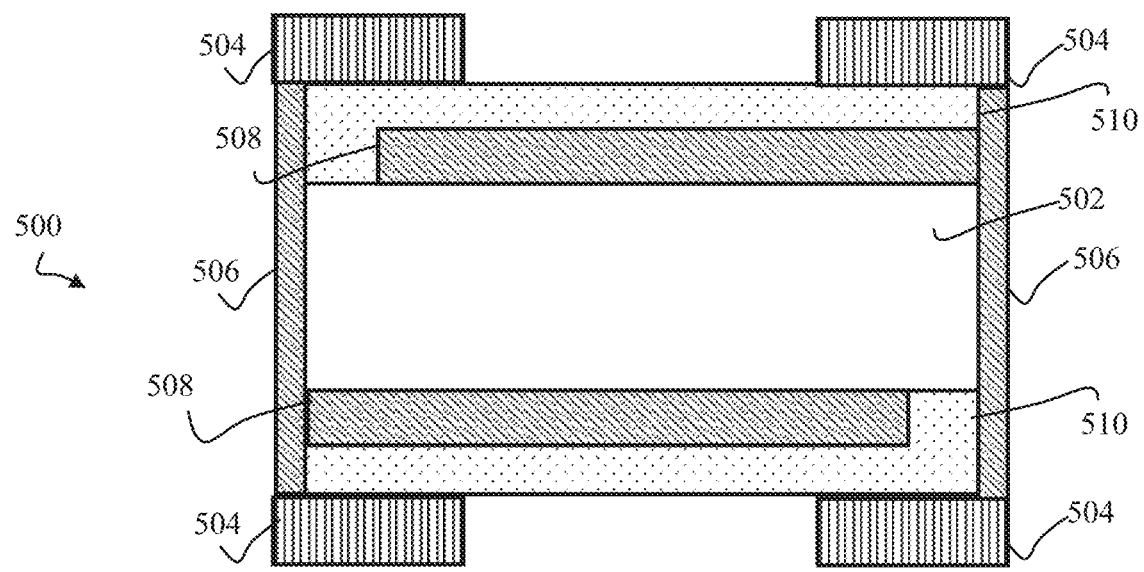
FIG. 5 shows a PPTC device according to various other embodiments of the disclosure.
Figure 6:
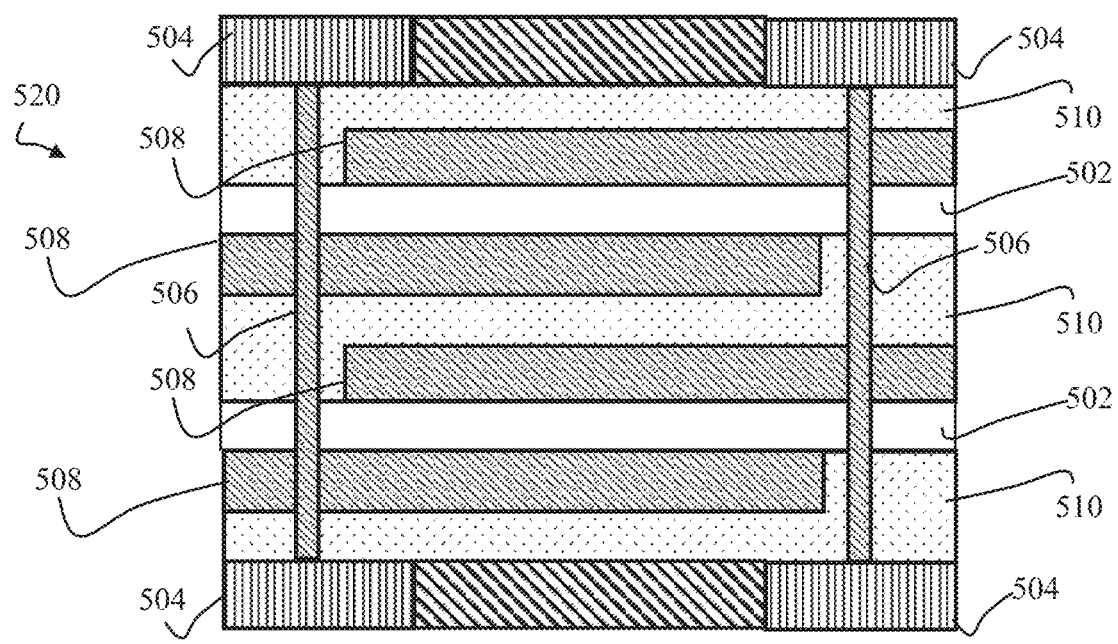
FIG. 6 show a PPTC device according to various additional embodiments of the disclosure.

FIG. 5 and FIG. 6 depict side cross-sectional views of embodiments of a single layer surface mount PPTC device 500 and a double layer surface mount PPTC device 600, according to different embodiments of the disclosure. In these additional devices, the PPTC body may be formulated generally as described above, for operation at a low trip temperature, such as below 150 C. In these additional devices, the PPTC body may be formulated generally as described above, for operation at a low trip temperature, such as below 150° C. The PPTC device 500 and PPTC device 520 each have similar components, including metal electrodes 504, metal structures 506, metal foil electrode 508, PTC layer 502, insulation layer 510, and solder mask 514.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A fuse device, comprising:
a PPTC body sandwiched between a first metal foil electrode and a second metal foil electrode, the first metal foil electrode having a first side and a second side, the second metal foil having a third side and a fourth side, the first side being disposed adjacent a first portion of the PPTC body and the third side being disposed adjacent a second portion of the PPTC body;
a first insulation layer disposed adjacent the second side, the first insulation layer also being disposed adjacent the first portion of the PPTC body;
a second insulation layer disposed adjacent the fourth side, the second insulation layer also being disposed adjacent the second portion of the PPTC body;
a first electrode disposed adjacent the first insulation layer;
a second electrode disposed adjacent the second insulation layer; and
a first metal structure disposed orthogonal to the first metal foil electrode, the first metal structure being disposed adjacent the first insulation layer, the first metal foil electrode, the PPTC body, and the second insulation layer;
wherein the PPTC body comprises a polymer matrix and a conductive filler, the conductive filler comprising tungsten carbide;
wherein the polymer matrix comprises 35% to 75% by volume fraction of the PPTC body;
wherein the conductive filler comprises 25% to 65% by volume fraction of the PPTC body;
wherein the polymer matrix comprises a polyvinylidene fluoride material having a melting temperature of between 90° C. and 110° C.; and
wherein the fuse device has a trip temperature below 150° C.

2. The fuse device of claim 1, comprising a trip temperature of 90° C.

3. The fuse device of claim 1, wherein a hold current density of the PPTC body at 25° C. ranges from 0.05 to 0.4 A/mm$^2$.

4. The fuse device of claim 1, wherein the conductive filler comprises 44% by volume fraction of the PPTC body.

5. The fuse device of claim 1, wherein a gradual increase in resistance occurs above 40° C.

6. The fuse device of claim 5, wherein an abrupt increase in resistance occurs at between 80° C. and 100° C.

7. The fuse device of claim 1 wherein a volume resistivity of the conductive filler is less than 500 µΩ-cm.

* * * * *